(12) United States Patent
Baker et al.

(10) Patent No.: US 12,540,714 B2
(45) Date of Patent: Feb. 3, 2026

(54) TURN LAMPS AND SIDE MARKER LAMPS FOR FRONT AND REAR OF A VEHICLE

(71) Applicant: Rivian IP Holdings, LLC, Irvine, CA (US)

(72) Inventors: Simon Baker, Basingstoke (GB); Shammika Ashan Wickramasinghe, Banbury (GB); Timothy Beaven, Bicester (GB); Siobhan Marie Casey, Newport Beach, CA (US); Priyank Kumar, Ypsilanti, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 19/000,304

(22) Filed: Dec. 23, 2024

(65) Prior Publication Data
US 2025/0257859 A1 Aug. 14, 2025

Related U.S. Application Data

(60) Provisional application No. 63/553,599, filed on Feb. 14, 2024.

(51) Int. Cl.
*F21S 43/50* (2018.01)
*F21S 43/10* (2018.01)
*F21W 103/15* (2018.01)
*F21W 103/20* (2018.01)

(52) U.S. Cl.
CPC ............. *F21S 43/50* (2018.01); *F21S 43/10* (2018.01); *F21W 2103/15* (2018.01); *F21W 2103/20* (2018.01)

(58) Field of Classification Search
CPC ............ F21S 43/10; F21S 43/50; F21S 43/20; F21W 2103/20; F21W 2103/15
See application file for complete search history.

(56) References Cited

U.S. PATENT DOCUMENTS

| 6,910,788 | B2 | 6/2005 | Jones |
| 9,963,001 | B2 | 5/2018 | Salter |
| 2007/0091628 | A1 | 4/2007 | Van Order |
| 2008/0253140 | A1 | 10/2008 | Fleischmann |
| 2014/0181185 | A1 | 6/2014 | Day |

FOREIGN PATENT DOCUMENTS

| CN | 110778987 A | * | 2/2020 | ............... F21S 43/14 |
| CN | 118339403 A | * | 7/2024 | ............ F21S 43/195 |
| DE | 102023118868 A1 | * | 1/2025 | ............... B60Q 1/28 |

OTHER PUBLICATIONS

Inovation Q+ NPL Search (Year: 2024).*

* cited by examiner

*Primary Examiner* — Anabel Ton
(74) *Attorney, Agent, or Firm* — BAKERHOSTETLER

(57) ABSTRACT

An integrated assembly of turn signal light source and a side marker light source is implemented for a vehicle. The assembly may be one of several assemblies for the vehicle. Multiple assemblies may be carried by bumper (e.g., front bumper and rear bumper) of the vehicle. For example, the assembly may be located at each of a front driver's side corner and a passenger's side corner, with each assembly positioned in the front bumper. Additionally, the assembly may be located at each of a rear driver's side corner and a passenger's rear corner, with each assembly positioned in the rear bumper.

20 Claims, 11 Drawing Sheets

1

TURN LAMPS AND SIDE MARKER LAMPS FOR FRONT AND REAR OF A VEHICLE

CROSS-REFERENCE TO RELATED APPLICATION(S)

This application claims the benefit of priority to U.S. Provisional Application No. 63/553,599 filed on Feb. 14, 2024, titled "TURN LAMPS AND SIDE MARKER LAMPS FOR FRONT AND REAR OF A VEHICLE", the disclosure of which is incorporated herein by reference in its entirety.

INTRODUCTION

The present disclosure is directed to lamps for vehicles, and more particularly, to turn lamps and side marker lamps integrated together in multiple locations of a vehicle.

SUMMARY

Vehicles may include turn lamps that, when illuminated (e.g., blinking), provide an indication to drivers and passengers in other vehicles, as well as pedestrians, that the vehicle may be turning in a particular direction. Further, vehicles may include side marker lamps that, when illuminated, increase visibility of the vehicle, such as during the night or other low-visibility conditions. Each of the turn lamps and side marker lamps may be located at the front and rear of vehicles. In one or more implementations, both the turn lamp and the side marker lamp are integrated into a single assembly.

In one or more aspects of the present disclosure, an apparatus is described. The apparatus may include a housing that defines an internal volume. The apparatus may further include a first light source disposed in the internal volume. The first light source may be configured to provide a turn signal for a vehicle. The apparatus may further include a second light source disposed in the internal volume. The second light source may be configured to provide a side marker for the vehicle.

The housing may be located at a front corner of the vehicle. The housing may be carried within a front bumper of the vehicle. The apparatus may further include a lens covering the first light source and the second light source. The front bumper may include a first curvature, and the lens may include a second curvature that may conform to the first curvature.

The housing may be located at a rear corner of the vehicle. The housing may be carried within a rear bumper of the vehicle. The apparatus may further include a lens covering the first light source and the second light source. The rear bumper may include a first curvature, and the lens may include a second curvature that may conform to the first curvature.

In one or more aspects of the present disclosure, a lamp assembly is described. The lamp assembly may include a first light source configured to provide a first indicator for a vehicle. The lamp assembly may further include a second light source configured to provide a second indicator for the vehicle. The first light source may be stacked over the second light source.

The first light source may include a turn signal for the vehicle. The second light source may include a side marker for the vehicle. The first light source and the second light source may be configured to be located in a housing disposed in a front bumper of the vehicle. Alternatively or in combination, the first light source and the second light source are configured to be located in a housing disposed in a rear bumper of the vehicle.

The apparatus may further include a lens that covers the first light source and the second light source. The lens may conform to a curvature of a front bumper or a rear bumper. The apparatus may further include a housing. The first light source and the second light source may be carried by the housing.

In one or more aspects of the present disclosure, a vehicle is described. The vehicle may include a bumper. The vehicle may further include a lamp assembly carried by the bumper. The lamp assembly may include a housing that defines an internal volume. The lamp assembly may further include a first light source disposed in the internal volume. The first light source may be configured to provide a turn signal for the vehicle. The lamp assembly may further include a second light source disposed in the internal volume. The second light source may be configured to provide a side marker for the vehicle.

The first light source may be stacked over the second light source. Alternatively, the second light source may be stacked over the first light source. The vehicle may further include a lens covering the first light source and the second light source. The bumper may include a front bumper that may include a first curvature, and the lens may include a second curvature that may conform to the first curvature.

The vehicle may further include a lens covering the first light source and the second light source. The bumper may include a rear bumper that may include a first curvature, and the lens may include a second curvature that may conform to the first curvature. In this regard, the housing may be located at a front corner of the vehicle or at a rear corner of the vehicle.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The present disclosure is directed to lamps, including lamp assemblies, for vehicles, including turn lamps and side marker lamps. As shown and/or described herein, lamps for vehicles may include multiple light sources integrated together, with each light source performing a different function. For example, one light source may illuminate in accordance with a frequency to provide a turn signal (e.g., left turn signal, right turn signal) for the vehicle. Another light source may illuminate to provide a side marker for enhanced visibility of the vehicle. By integrating two light sources together that perform different functions, lamps may take on a reduced footprint on the vehicle. Moreover, the lamps may reduce the overall mass of the vehicle (e.g., by reducing the number of housings and other associated components for two separate lamps performing two different functions) as well as the overall cost of the vehicle.

Figure 1:
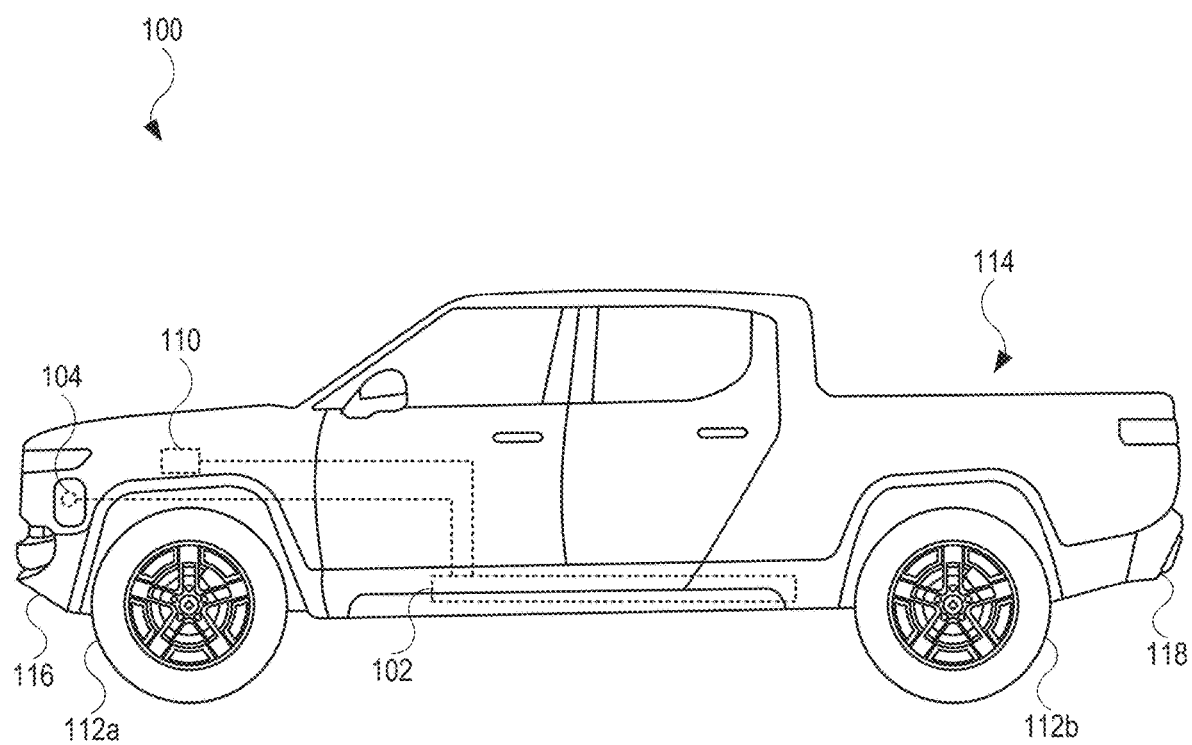
FIG. 1 illustrates a side view of an example of a vehicle, in accordance with one or more aspects of the present disclosure.

FIG. 1 illustrates an example of a vehicle 100, in accordance with one or more aspects of the present disclosure. In the example shown in FIG. 1, the vehicle 100 takes the form of a truck. Generally, the vehicle 100 may take the form of any motorized vehicle, including motorized vehicles with an internal combustion engine and/or one or more electric motors. Accordingly, other implementations of the vehicle 100 may include land-based vehicles, such as a car (e.g., sedan, hatchback), a van, or a commercial truck, as non-limiting examples.

The vehicle 100 may include a battery pack 102. The battery pack 102 may be coupled (e.g., electrically coupled) to one or more electrical systems of the vehicle 100 to provide power to the one or more electrical systems. The vehicle 100 may further include a port 104 (e.g., charge port) designed to receive a cable connector (not shown in FIG. 1) used to transmit power (e.g., alternating current (AC) power) that is converted to direct current (DC) power to charge the battery pack 102. The battery pack 102 may couple to a drive unit 110, representative of one or more drive units of the vehicle 100. While the drive unit 110 is shown as generally being in the front of the vehicle 100, the drive unit 110 may be located in the rear of the vehicle 100. Further, when multiple drive units are used, at least one drive unit may be in the front of the vehicle 100 to drive the front wheels (e.g., wheel 112a), and at least one drive unit may be in the rear of the vehicle 100 to drive the rear wheels (e.g., wheel 112b). The drive unit 110 may include, for example, a motor, an inverter, a gear box, and a differential. In the example shown in FIG. 1, the drive unit 110 takes the form of an electric motor. In this regard, the drive unit 110 may use energy (e.g., electrical energy) stored in the battery pack 102 for propulsion in order to drive (e.g., rotationally drive) the wheels of the vehicle 100. The vehicle 100 may further include a bed 114 that may be used as a storage area for the vehicle 100. Also, the vehicle 100 may include a bumper 116 (e.g., front bumper) and a bumper 118 (e.g., rear bumper).

Figure 2:
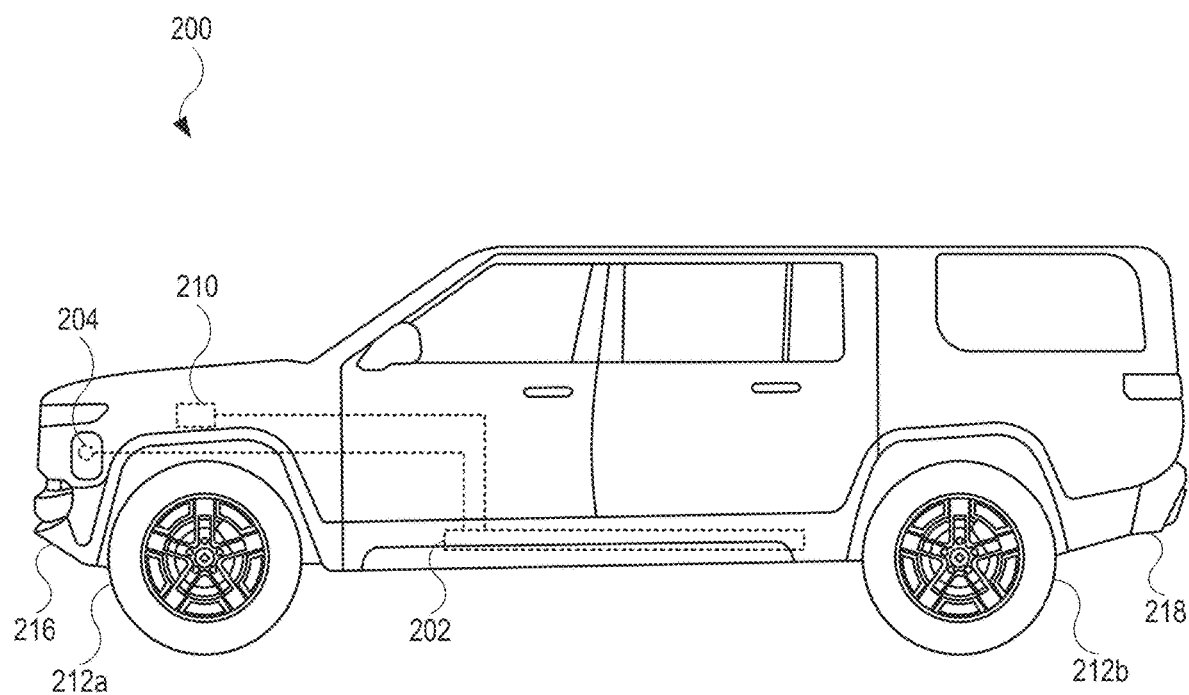
FIG. 2 illustrates a side view of an alternate example of a vehicle, in accordance with one or more aspects of the present disclosure.

FIG. 2 illustrates a side view of an alternate example of a vehicle 200, in accordance with one or more aspects of the present disclosure. As shown, the vehicle 200 takes the form of a sport utility vehicle (SUV). The vehicle 200 may include several features similar in design and function as shown and/or described for the vehicle 100 (shown in FIG. 1). For example, the vehicle 200 may include a battery pack 202, a port 204 (e.g., charge port), a drive unit 210 (representative of one or more additional drive units), a wheel 212a (representative of an additional front wheel), and a wheel 212b (representative of an additional rear wheel), a bumper 216, and a bumper 218.

FIGS. 3-10 show various examples of vehicles with lamps that may be integrated into a housing, or enclosure. Also, each lamp may include two or more light sources. The vehicles shown in FIG. 3-8 may take the form of a truck (e.g., vehicle 100 shown in FIG. 1) or an SUV (e.g., vehicle 200 shown in FIG. 2).

Figure 3:
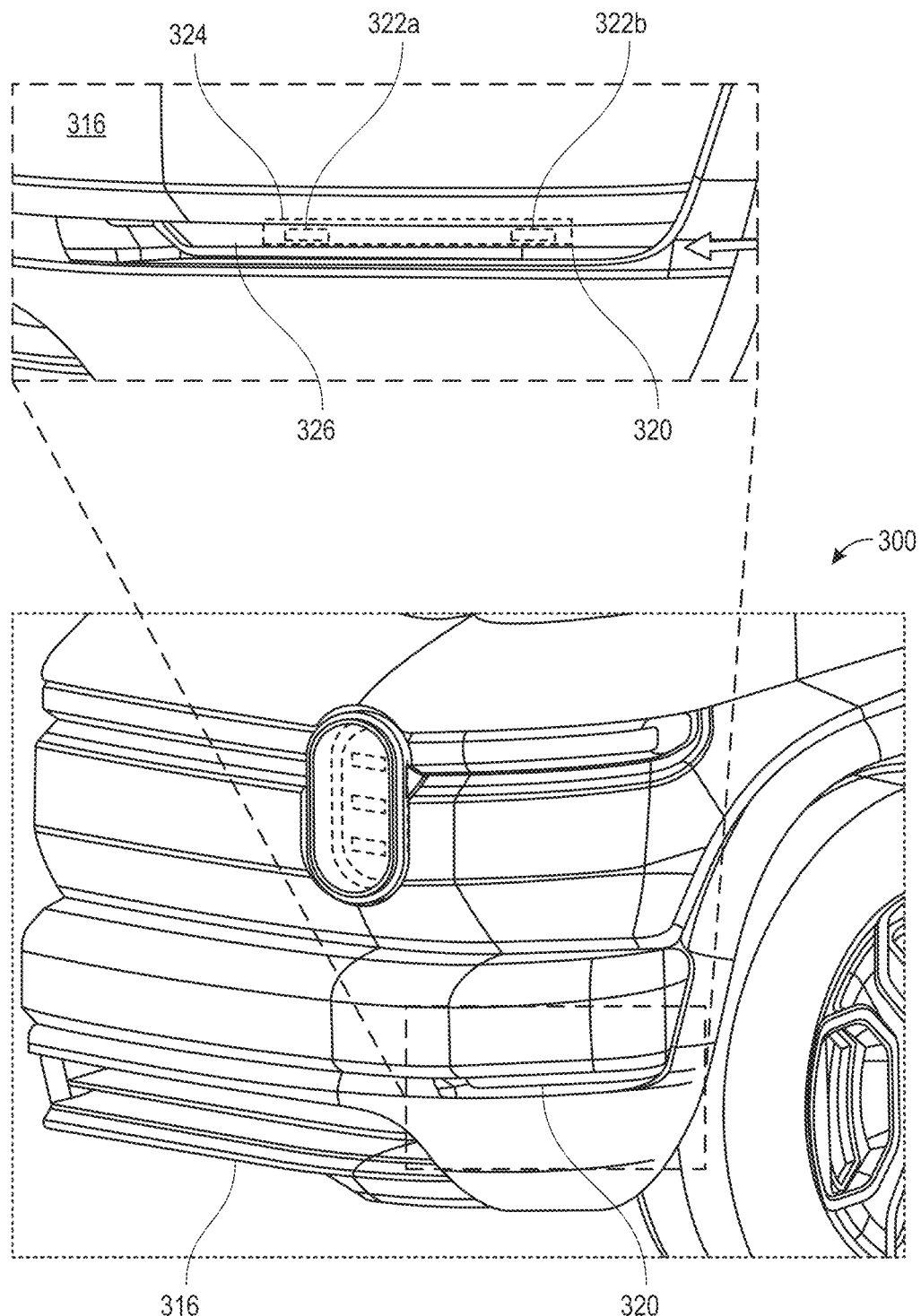
FIG. 3 illustrates a front perspective view of a vehicle showing an example of an apparatus with multiple light sources, in accordance with one or more aspects of the present disclosure.

FIG. 3 illustrates a front perspective view of a vehicle 300 showing an example of an apparatus 320 with multiple light sources, in accordance with one or more aspects of the present disclosure. As shown, the apparatus 320 (e.g., lamp assembly) is positioned in and carried by a bumper 316 (e.g., front bumper) of the vehicle 300. The apparatus 320 may be representative of an additional apparatus (not shown in FIG. 3) positioned in and carried by the bumper 316. In this regard, the apparatus 320 is shown in a front driver corner of the bumper 316 of the vehicle 300 and the additional apparatus may be located in a front passenger corner of the bumper 316 of the vehicle 300.

As shown in the enlarged view, the apparatus 320 includes a light source 322a and a light source 322b. Each of the light sources 322a and 322b may take the form of a light-emitting diode (LED) or an incandescent bulb, as non-limiting examples. Each of the light sources 322a and 322b may perform different functions for the vehicle 300. For example, the light source 322a may function as a turn signal (e.g., left turn signal). In this regard, the light source 322a, when operational, may illuminate by blinking (e.g., turn on and off) to provide an indication the vehicle 300 is turning in the direction of the light source 322a. The light source 322b may function as a side marker for the vehicle 300. In this regard, the light source 322b may illuminate to provide enhanced visibility for the vehicle 300. Accordingly, each of the light sources 322a and 322b may provide a different type of indication. As shown, the light source 322a is centrally located relative to the light source 322b, thus the turn signal is centrally located relative to the side marker. However, in other implementations, the functionality is reversed.

Additionally, the apparatus 320 may include a housing 324 that provides an internal volume, allowing the housing 324 to carry both of the light sources 322a and 322b. Put another way, the lights sources 322a and 322b may be disposed in the housing 324. In this regard, the light sources 322a and 322b are generally in the same location in the bumper 316 of the vehicle 300. The apparatus 320 may further include a lens 326 coupled with the housing 324 and covering the light sources 322a and 322b. The lens 326 may include a curved surfaced to match the curvature of the bumper 316. For example, the bumper 316 may include a curvature (e.g., curved surface) and the lens 326 may include a curvature that conforms to the curvature of the bumper 316.

Figure 4A:
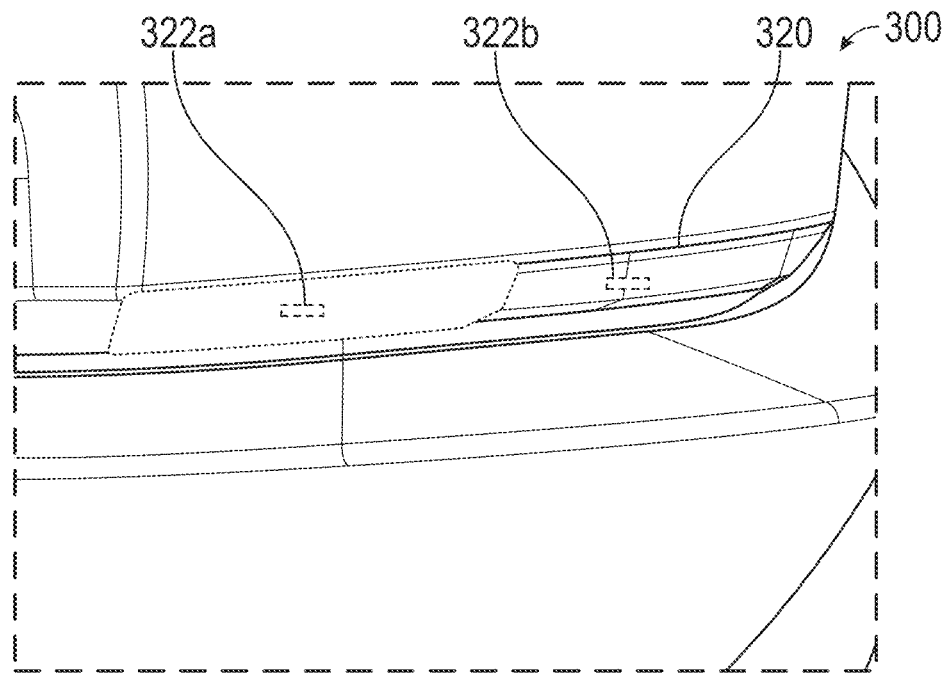
FIG. 4A and FIG. 4B illustrate front views of the apparatus of the vehicle, showing different light sources in the front of the vehicle illuminated, in accordance with one or more aspects of the present disclosure.
Figure 4B:
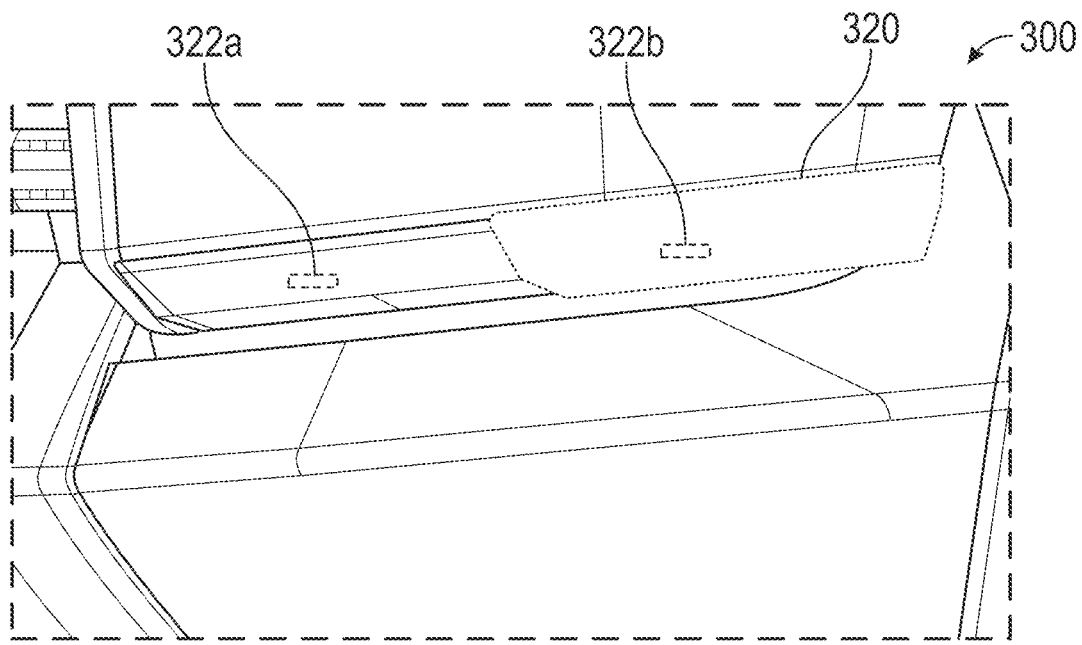

FIG. 4A and FIG. 4B illustrate front views of the apparatus 320 of the vehicle 300, showing different light sources illuminated, in accordance with one or more aspects of the present disclosure. Referring to FIG. 4A, the light source 322a is illuminated. Conversely, referring to FIG. 4B, the light source 322b, is illuminated. FIG. 4A and FIG. 4B show the lights sources 322a and 322b, when implemented as a turn signal and a side marker, respectively, may be positioned adjacent and laterally with respect to each other.

Figure 5:
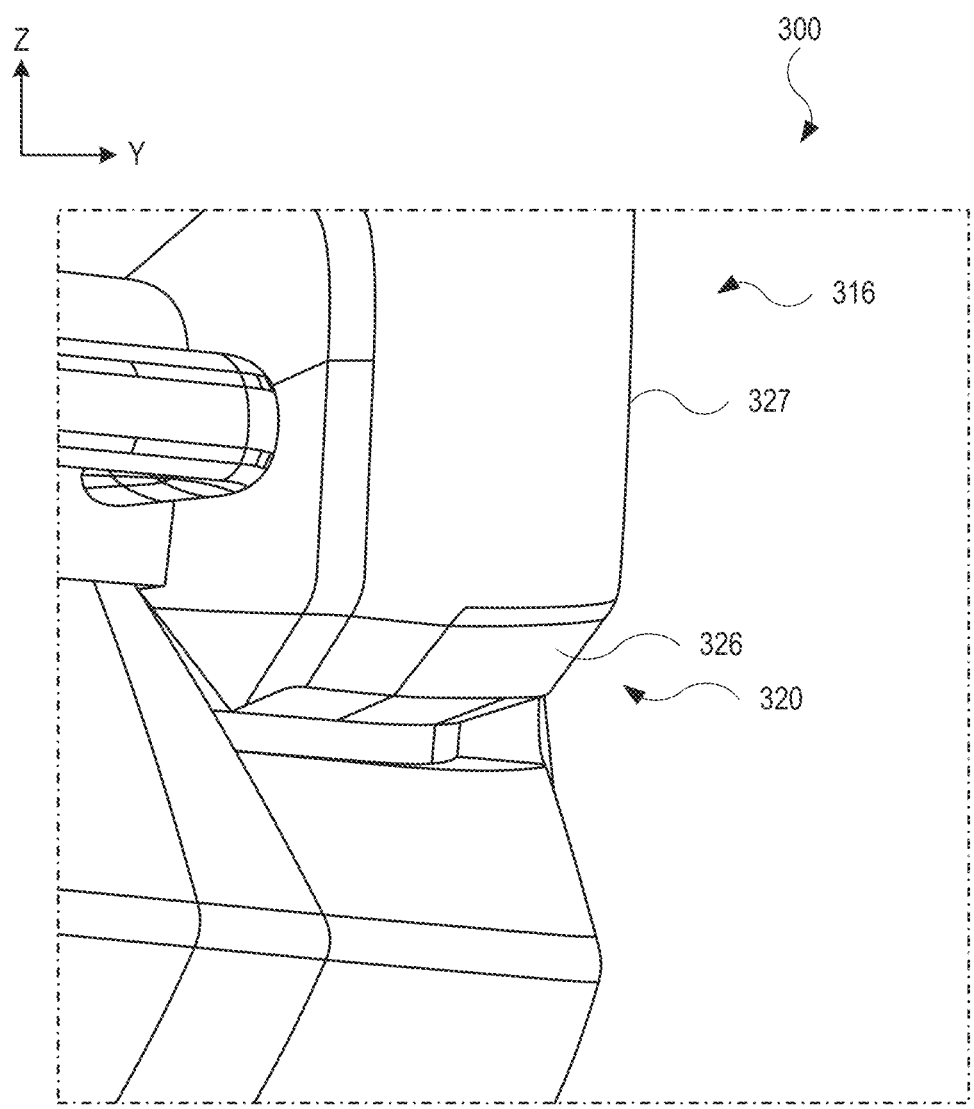
FIG. 5 illustrates an enlarged view showing a bumper of a vehicle, showing a lamp integrated with the bumper, in accordance with one or more aspects of the present disclosure.

FIG. 5 illustrates an enlarged view showing the bumper 316 of the vehicle 300, showing a lamp integrated with the bumper, in accordance with one or more aspects of the present disclosure. As shown, the bumper 316 may include a surface 327 that is planar (e.g., vertical), or substantially planar. The apparatus 320 may include an inboard apparatus. In this regard, the lens 326 of apparatus 320 may be an inboard lens. For example, the lens 326 may be angled approximately in the range of 30 to 50 degrees relative to the surface 327. In one or implementations, the angle is 45 degrees relative to the surface. Based on the inboard design, the apparatus 320 may be positioned inward with respect to the surface 327. Put another way, the surface 327 may extend beyond (e.g., in the Y-direction of Cartesian coordinates) the apparatus 320. In this regard, the apparatus 320 may be hidden, or at least partially hidden or relatively less visible, by the bumper 316 until at least one of the light source 322a or the light source 322b is illuminated. Although not shown, the apparatus 320 may alternatively include an outboard apparatus, and the lens 326 may extend laterally beyond the surface 327.

Figure 6:
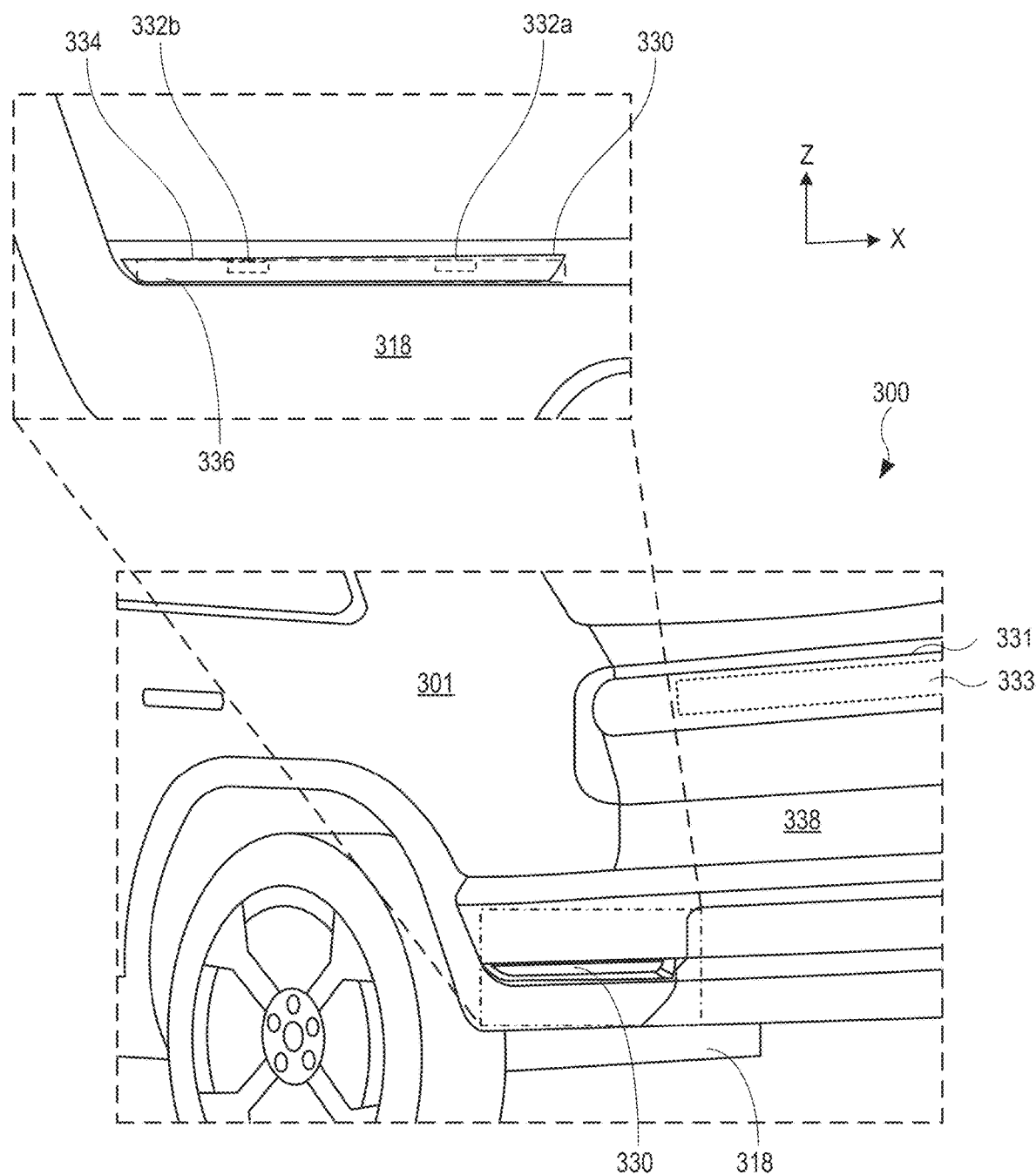
FIG. 6 illustrates a rear perspective view of a vehicle showing an example of an apparatus with multiple light sources, in accordance with one or more aspects of the present disclosure.

FIG. 6 illustrates a rear perspective view of the vehicle 300 showing an example of an apparatus 330 with multiple light sources, in accordance with one or more aspects of the present disclosure. As shown, the apparatus 330 (e.g., lamp assembly) is positioned in and carried by a bumper 318 (e.g., rear bumper) of the vehicle 300. The apparatus 330 may be representative of an additional apparatus (not shown in FIG. 3) positioned in and carried by the bumper 318. In this regard, the apparatus 330 is shown in a rear driver corner of the bumper 318 of the vehicle 300 and the additional apparatus may be located in a rear passenger corner of the bumper 318 of the vehicle 300.

As shown in the enlarged view, the apparatus 330 includes a light source 332a and a light source 332b. Each of the light sources 332a and 332b may each take the form of a light-emitting diode (LED) or an incandescent bulb, as non-limiting examples. Each of the light sources 332a and 332b may perform different functions for the vehicle 300. For example, the light source 332a may function as a turn signal (e.g., left turn signal). In this regard, the light source 332a, when operational, may illuminate by blinking (e.g., turn on and off) to provide an indication the vehicle 300 is turning in the direction of the light source 332a. The light source 332b may function as a side marker for the vehicle 300. In this regard, the light source 332b may illuminate to provide enhanced visibility for the vehicle 300. Accordingly, each of the light sources 332a and 332b may provide a different type of indication. As shown, the light source 332a is centrally located relative to the light source 332b, thus the turn signal is centrally located relative to the side marker. However, in other implementations, the functionality is reversed.

Additionally, the apparatus 330 may include a housing 334 that provides an internal volume, allowing the housing 334 to carry both of the light sources 332a and 332b. Put another way, the lights sources 332a and 332b may be disposed in the housing 334. In this regard, the light sources 332a and 332b are generally in the same location of the vehicle 300. The apparatus 330 may further include a lens 336 coupled with the housing 334 and covering the light sources 332a and 332b. The lens 336 may include a curved surfaced to match the curvature of the bumper 318. For example, the bumper 318 may include a curvature (e.g., curved surface) and the lens 336 may include a curvature that conforms to the curvature of the bumper 318.

Also, the vehicle 300 may include a body 301 (e.g., vehicle body) and a closure 338 rotationally coupled with the body 401. In one or more implementations, the closure 338 takes the form of a liftgate that rotates and generally moves in the Z-direction when opened. The apparatus 330 further includes an apparatus 331 that includes a light source 333 that functions as a braking light that illuminates when a brake pedal (not shown in FIG. 6) of the vehicle 300 is depressed. In one or more implementations, the apparatus 331 includes at least two additional light sources, with one light source functioning as a left turn signal and another light source functioning as a right turn signal. As shown, the apparatus 331 is located on the closure 338. Accordingly, movement of the closure 338 will also cause movement of the apparatus 331.

Figure 7A:
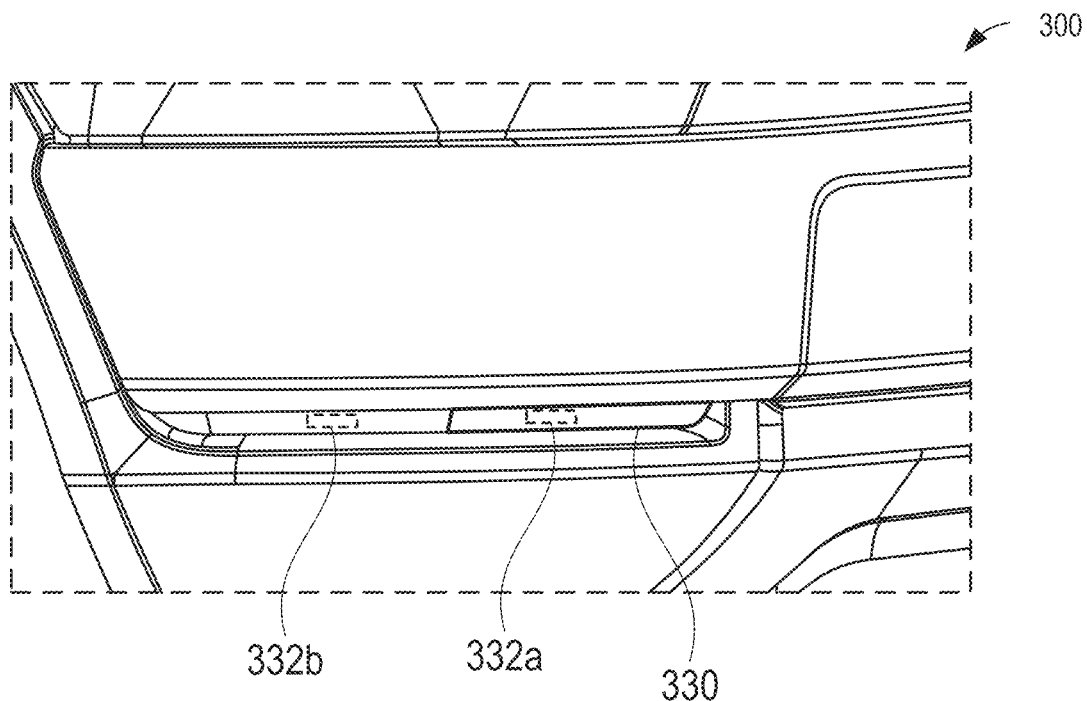
FIG. 7A and FIG. 7B illustrate rear views of the apparatus of the vehicle, showing different light sources in the rear of the vehicle illuminated, in accordance with one or more aspects of the present disclosure.
Figure 7B:
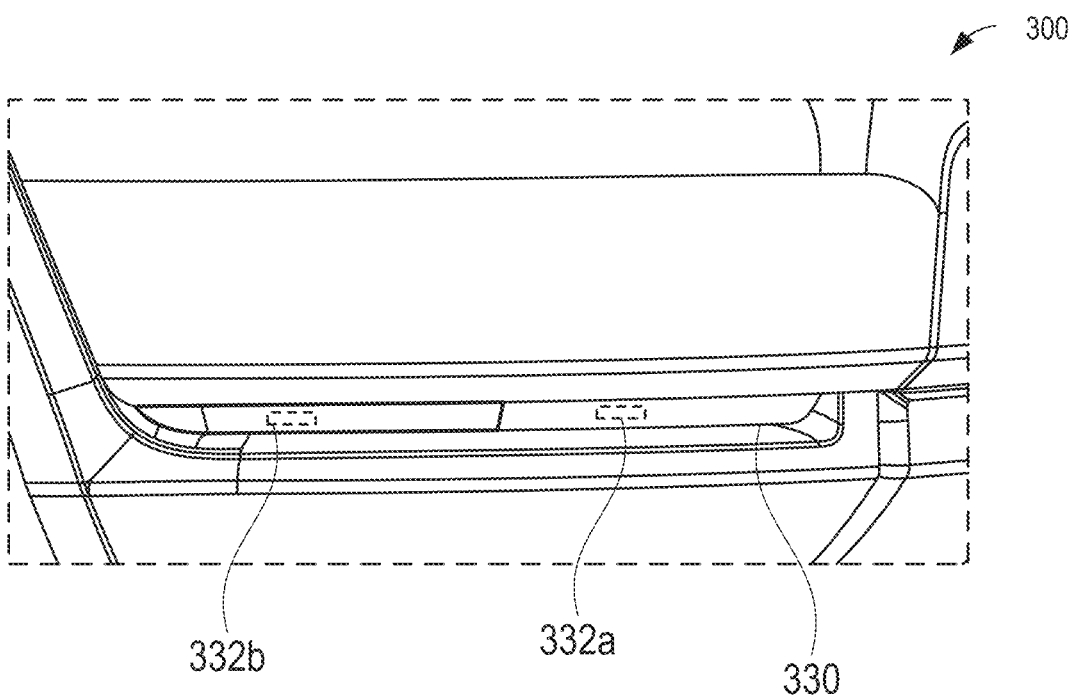

FIG. 7A and FIG. 7B illustrate the apparatus 330, showing different light sources illuminated, in accordance with one or more aspects of the present disclosure. Referring to FIG. 7A, the light source 332a is illuminated. Conversely, referring to FIG. 7B, the light source 332b, is illuminated. FIG. 7A and FIG. 7B show the lights sources 332a and 332b, when implemented as a turn signal and a side marker, respectively, may be positioned adjacent and laterally with respect to each other. Additionally, the apparatus 330 may take the form of an inboard apparatus, and accordingly, the lens 336 (shown in FIG. 6) of the apparatus 330 may take the form of an inboard lens. In this regard, the apparatus 330 may be hidden, or at least partially hidden or relatively less visible, by the bumper 318 until at least one of the light source 332a or the light source 332b is illuminated.

Figure 8:
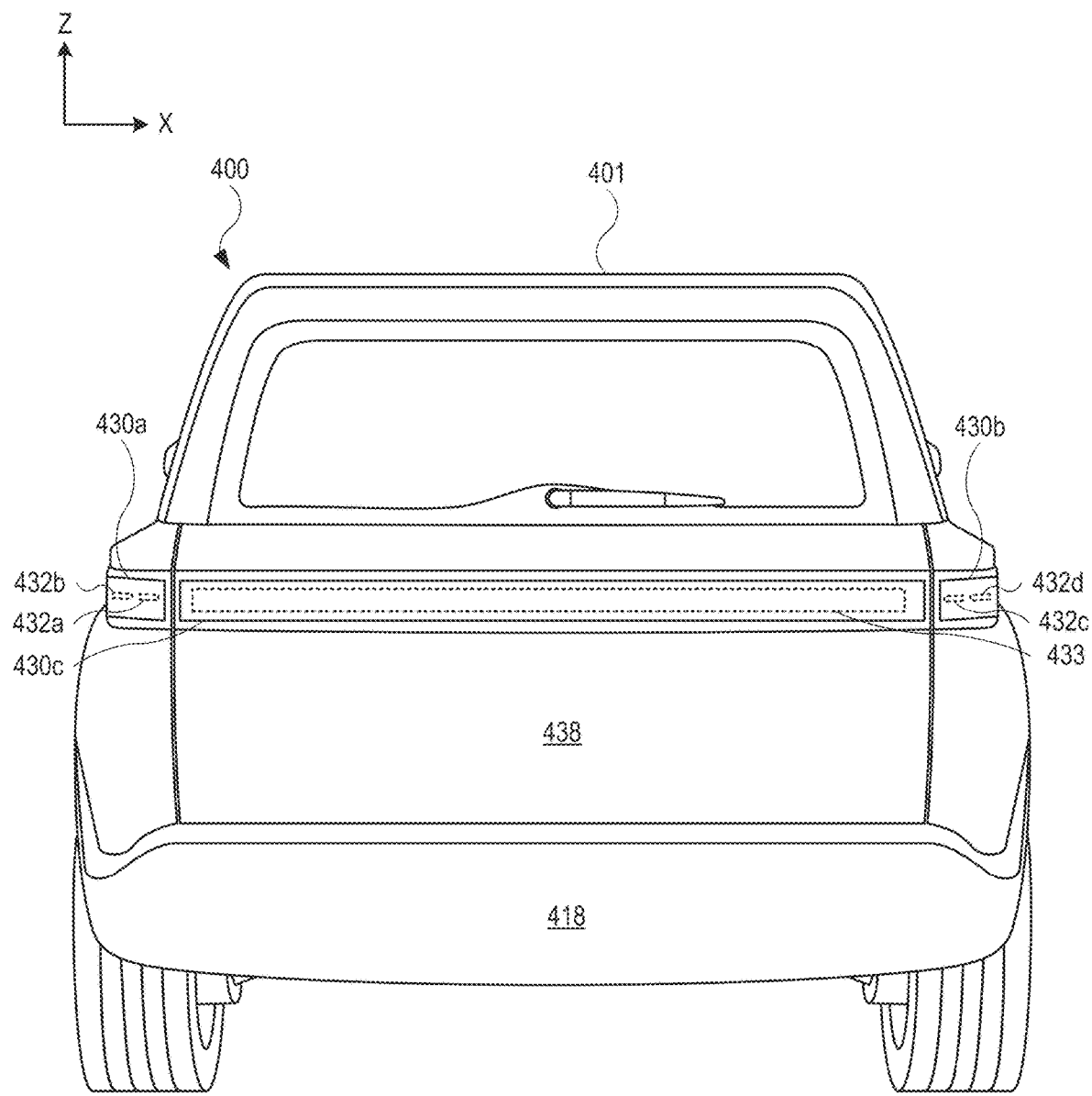
FIG. 8 illustrates a rear view of a vehicle, in accordance with one or more aspects of the present disclosure.

FIG. 8 illustrates a rear view of an alternate embodiment of a vehicle 400, in accordance with one or more aspects of the present disclosure. Although not shown, the vehicle 400 may include a front bumper similar to the bumper 316 (shown in FIG. 3). Accordingly, the vehicle 400 may include multiple apparatuses similar to the apparatus 320 (shown in FIG. 3). However, the vehicle 400 may include some light sources in different positions in the rear portion. For example, the vehicle 400 may include a body 401 (e.g., vehicle body) and a closure 438 rotationally coupled with the body 401. In one or more implementations, the closure 438 takes the form of a liftgate that rotates and generally moves in the Z-direction when opened.

The vehicle 400 may include an apparatus 430a, an apparatus 430b, and an apparatus 430c. The apparatus 430a may include a light source 432*a* and a light source 432*b*. The light source 432*a* may function as a turn signal (e.g., left turn signal). In this regard, the light source 432*a*, when operational, may illuminate by blinking (e.g., turn on and off) to provide an indication the vehicle 300 is turning in the direction of the light source 432*a*. The light source 432*b* may function as a side marker for the vehicle 400. Similarly, the apparatus 430*b* may include a light source 432*c* and a light source 432*d* that functions as a turn signal (e.g., right turn signal) and a side marker, respectively. Unlike prior embodiments in which an apparatus is integrated with a bumper (e.g., bumper 418) of a vehicle, the apparatus 430*a* and the apparatus 430*b* are positioned on the body 401. The apparatus 430*c* may include a light source 433 that functions as a braking light that illuminates when a brake pedal (not shown in FIG. 8) of the vehicle 400 is depressed. As shown, the apparatus 430*c* is located on the closure 438. Accordingly, movement of the closure 438 will also cause movement of the apparatus 430*c*.

Figure 9:
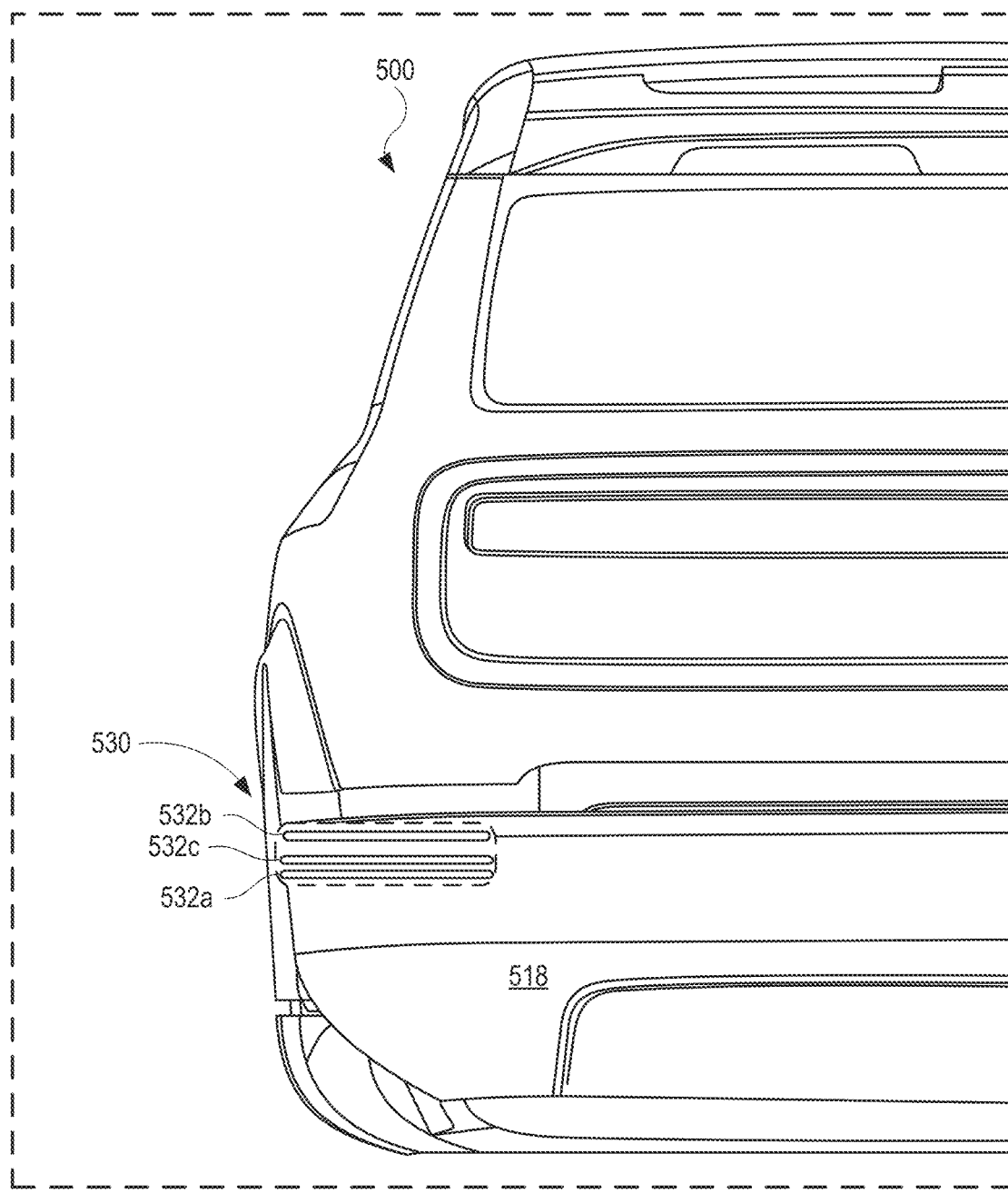
FIG. 9 illustrates a rear view of a vehicle showing an alternate embodiment of an apparatus with multiple rear lights, in accordance with one or more aspects of the present disclosure.

FIG. 9 illustrates a rear view of a vehicle 500 showing an alternate embodiment of an apparatus 530 with multiple rear lights, in accordance with one or more aspects of the present disclosure. As shown, the apparatus 530 includes a light source 532*a*, a light source 532*b*, and a light source 532*c*. The apparatus 530 is positioned in and carried by a bumper 518 (e.g., rear bumper) of the vehicle 500, and is representative of an additional apparatus (not shown in FIG. 9) of the vehicle 500. As non-limiting examples, the light source 532*a* may take the form of a turn signal, the light source 532*b* may take the form of a side marker, and the light source 532*c* make take the form of a reflex light source. As shown, the light sources 532*a*, 532*b*, and 532*c* are in a stacked configured, with the light source 532*c* stacked over the light source 532*a* and the light source 532*b* stacked over the light sources 532*a* and 532*c*.

Figure 10:
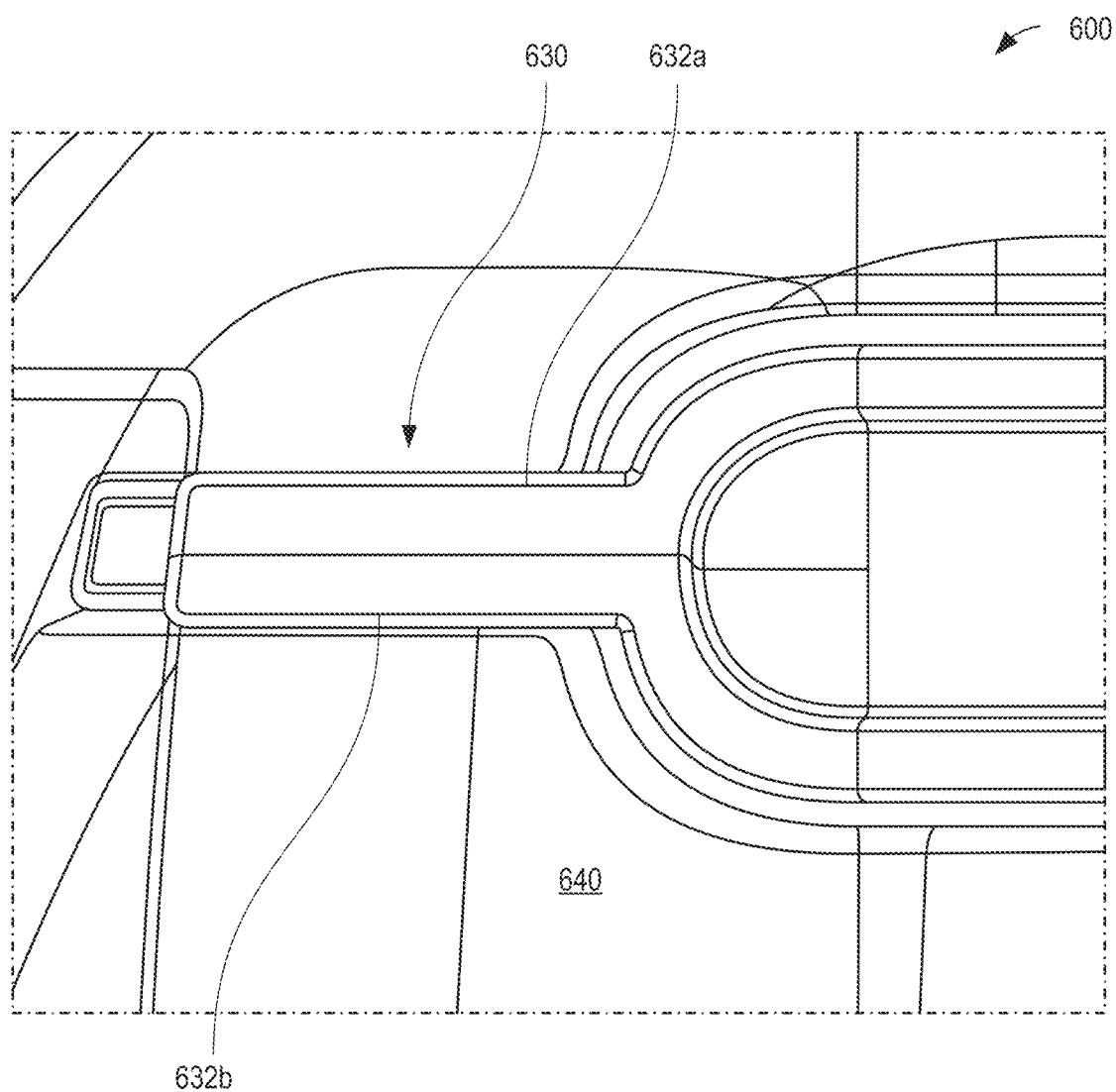
FIG. 10 illustrates an enlarged rear perspective view of a vehicle showing an alternate embodiment of an apparatus with multiple rear lights, in accordance with one or more aspects of the present disclosure.

FIG. 10 illustrates a rear view of a vehicle 600 showing an alternate embodiment of an apparatus 630 with multiple rear lights, in accordance with one or more aspects of the present disclosure. As shown, the apparatus 630 includes a light source 632*a* and a light source 632*b*. The apparatus 630 is positioned in and carried by a tailgate 640 of the vehicle 600, and is representative of an additional apparatus (not shown in FIG. 19) of the vehicle 600. As non-limiting examples, the light source 632*a* may take the form of a turn signal and the light source 632*b* may take the form of a side marker. As shown, the light sources 632*a* and 632*b* are in a stacked configured, with the light source 632*a* stacked over the light source 632*b*.

Figure 11:
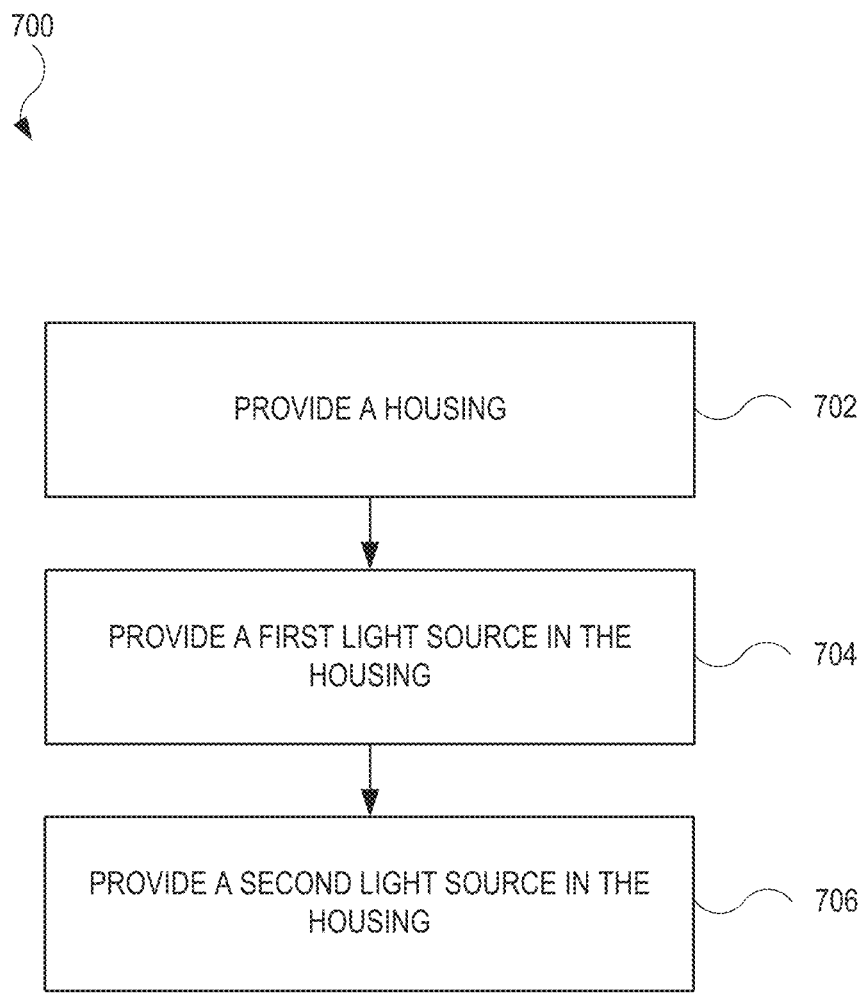
FIG. 11 illustrates a flow diagram showing an example of a process that may be performed for assembling a lamp, in accordance with one or more aspects of the present disclosure.

FIG. 11 illustrates a flow diagram showing example of a process 700 that may be performed for assembling a head lamp, in accordance with one or more aspects of the present disclosure. For explanatory purposes, the process 700 primarily described herein with reference to the lamps (e.g., head lamps) shown and/or described in FIGS. 3-10 and the accompanying portions of this detailed description. However, the process 700 are not limited to the lamps (e.g., apparatus) shown and/or described in FIGS. 3-10, and one or more blocks (or operations) of the process 700 may be performed by one or more other components of other suitable moveable apparatuses, devices, or systems. Further for explanatory purposes, some of the blocks of the process 700 are described herein as occurring in serial, or linearly. However, multiple blocks of the process 700 may occur in parallel. In addition, the blocks of the process 700 need not be performed in the order shown and/or one or more blocks of the process need not be performed and/or can be replaced by other operations.

At block 702, a housing is provided. The housing may be positioned in a bumper, such as a front bumper and/or a rear bumper of a vehicle.

At block 704, a first light source is provided in the housing. The first light source make take the form of a turn signal.

At block 706, a second light source is provided in the housing. The second light source make take the form of a side marker. The first light source and the second light source may be adjacent to each other, or conversely, may be in a stacked configuration.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An apparatus, comprising:
a housing that defines an internal volume and configured to be carried within a bumper having a first curvature;
a first light source disposed in the internal volume, the first light source configured to provide a turn signal for a vehicle;
a second light source disposed in the internal volume, the second light source configured to provide a side marker for the vehicle; and
a lens covering the first light source and the second light source, wherein the lens comprises a second curvature that conforms to the first curvature.

2. The apparatus of claim 1, wherein the housing is located at a front corner of the vehicle.

3. The apparatus of claim 1, wherein the housing is located at a rear corner of the vehicle.

4. The apparatus of claim 3, wherein the housing is carried within a rear bumper of the vehicle.

5. The apparatus of claim 1, wherein the first light source is positioned laterally with respect to the second light source.

6. A lamp assembly, comprising:
a first light source configured to provide a first indicator for a vehicle;
a second light source configured to provide a second indicator for the vehicle, wherein the first light source is positioned laterally with respect to the first light source the second light source; and
an inboard lens that covers the first light source and the second light source, wherein the inboard lens is positioned inward with respect to a bumper of the vehicle.

7. The lamp assembly of claim 6, wherein the first light source comprises a turn signal for the vehicle.

8. The lamp assembly of claim 6, wherein the second light source comprises a side marker for the vehicle.

9. The lamp assembly of claim 6, wherein the first light source and the second light source are configured to be located in a housing disposed in a front bumper of the vehicle.

10. The lamp assembly of claim 6, wherein the first light source and the second light source are configured to be located in a housing disposed in a rear bumper of the vehicle.

11. The lamp assembly of claim 6, further comprising a housing, wherein the first light source and the second light source are carried by the housing.

12. A vehicle, comprising:
a bumper;
a lamp assembly carried by the bumper, the lamp assembly comprising:
a housing that defines an internal volume;
a first light source disposed in the internal volume, the first light source configured to provide a turn signal for the vehicle;
a second light source disposed in the internal volume and positioned laterally with respect to the first light source, the second light source configured to provide a side marker for the vehicle; and
an inboard lens covering the first light source and the second light source, the inboard lens diagonally positioned inward relative to the bumper.

13. The vehicle of claim 12, wherein the first light source is stacked over the second light source.

14. The vehicle of claim 12, wherein the second light source is stacked over the first light source.

15. The vehicle of claim 12, wherein:
the bumper comprises a front bumper that includes a first curvature, and
the inboard lens comprises a second curvature that conforms to the first curvature.

16. The vehicle of claim 12, wherein:
the bumper comprises a rear bumper that includes a first curvature, and
the inboard lens comprises a second curvature that conforms to the first curvature.

17. The vehicle of claim 12, wherein the housing is located at a front corner of the vehicle or at a rear corner of the vehicle.

18. The apparatus of claim 1, wherein the lens comprises an inboard lens.

19. The apparatus of claim 18, wherein the inboard lens is angled between 30 to 50 degrees relative to the bumper.

20. The lamp assembly of claim 6, wherein the inboard lens is angled between 30 to 50 degrees relative to the bumper.

* * * * *